(12) United States Patent
Bauer

(10) Patent No.: US 7,873,151 B1
(45) Date of Patent: Jan. 18, 2011

(54) USER-CONTROLLED PERSONALIZED ANNOUNCEMENTS FOR ACCOUNT-BASED SERVICES

(75) Inventor: Thomas Michael Bauer, Hillsborough, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1254 days.

(21) Appl. No.: 11/214,171

(22) Filed: Aug. 29, 2005

Related U.S. Application Data

(60) Provisional application No. 60/611,993, filed on Sep. 22, 2004.

(51) Int. Cl.
H04M 15/00 (2006.01)
H04M 11/00 (2006.01)

(52) U.S. Cl. .............................. 379/114.2; 379/114.15; 379/88.18

(58) Field of Classification Search . 379/114.15–114.2, 379/72, 76, 88.04, 88.05, 88.18, 144, 201.01, 379/201.02, 201.03, 201.12
See application file for complete search history.

(56) References Cited

U.S. PATENT DOCUMENTS

| | | | | |
|---|---|---|---|---|
| 5,251,251 A | * | 10/1993 | Barber et al. | 379/88.23 |
| 5,448,625 A | * | 9/1995 | Lederman | 379/88.25 |
| 5,787,151 A | * | 7/1998 | Nakatsu et al. | 379/88.23 |
| 5,864,609 A | * | 1/1999 | Cross et al. | 379/114.13 |
| 6,009,150 A | * | 12/1999 | Kamel | 379/88.22 |
| 6,480,588 B1 | | 11/2002 | Donovan | |
| 6,581,827 B2 | | 6/2003 | Welton | |
| 6,621,892 B1 | * | 9/2003 | Banister et al. | 379/88.14 |
| 6,853,715 B2 | * | 2/2005 | Flanagan | 379/201.12 |
| 6,873,690 B2 | | 3/2005 | Moon et al. | |
| 7,145,989 B1 | * | 12/2006 | Bond et al. | 379/76 |
| 7,180,990 B1 | * | 2/2007 | Henderson et al. | 379/114.2 |
| 2002/0091572 A1 | * | 7/2002 | Anderson et al. | 705/16 |

* cited by examiner

Primary Examiner—Quoc D Tran
(74) Attorney, Agent, or Firm—Hope Baldaulf Hartman, LLC

(57) ABSTRACT

System for providing a custom message to a calling card account for a user to receive the custom message upon usage of the calling card account include at least two data databases on data storage devices, wherein the databases are in communication with a processor and an interface. One database includes calling card accounts. The other database includes custom messages. The interface allows the user to query the custom message database for custom messages and displaying the results. A custom message can be selected and associated with one or more calling card accounts.

17 Claims, 3 Drawing Sheets

USER-CONTROLLED PERSONALIZED ANNOUNCEMENTS FOR ACCOUNT-BASED SERVICES

CROSS REFERENCE TO RELATED APPLICATIONS

The present application claims priority to U.S. Provisional Patent Application Ser. No. 60/611,993 filed on Sep. 22, 2004.

FIELD

The present embodiments relate generally to a customized recorded announcement that is tied to a calling card account, such as a prepaid telephone calling card.

BACKGROUND

Prepaid telecommunications services are increasing in popularity, especially with regard to family members or persons with special relations, interested clients or customers, the credit challenged or persons with no established credit (e.g., teens), and voters or donors for political candidates.

A customer typically purchases a prepaid calling card for the service, and when activated by the customer, the service provider that issued the prepaid calling card credits the customer's account with the amount of the prepaid card. Known prepaid calling cards are typically sold in fixed value increments ($10, $20, etc.) and require access codes (i.e., personal identification number or PINs) for their usage. To use the prepaid calling card, a designated access telephone number is dialed by the cardholder for accessing a computerized call processor system. When the call is connected to the calling system, the cardholder enters his access code or PIN to connect to a desired destination telephone number. Typically a beep sounds at this point. A charge is then deducted by the call processor system from the account or balance associated with the access code. The computerized call processor then connects the user to the designated called number after acknowledging the access code. Typically, the prepaid service call processor system will apply in real-time a usage charge on a per-minute basis debiting the account balance as the call proceeds.

With prepaid calling card services in the currently known art, the purchaser of the service can give the prepaid calling card to another person for calling time use. Typically there has been no thought given to some kind of customized message for the use of the calling card holders unless they are known subscribers to a system.

Thus, a need exists for a way to broadcast a message, a selected custom message, which can be easily changed to an individual or group of calling card holders without requiring the account holders to reveal private information about themselves and without requiring the account holders to become subscribers to a service.

A need exists for a method to provide changeable messages to holders of prepaid calling cards to increase marketing by the providers of the prepaid calling cards.

The present embodiments meet these needs.

SUMMARY

The present embodiments contemplate systems and methods for providing a custom message to a calling card account for a user to receive the custom message upon usage of the calling card account. The calling card account can be a telephone card, an interne service paid up service card, another form of paid telecommunications service card, or other prepaid services. The systems contemplate having a processor, an administrator input device with display in communication with the processor, and a first data storage unit in communication with the processor. The first data storage unit includes a calling card account database. A second data storage unit in communication with the processor stores a custom message database.

The embodied systems include computer instructions for querying the custom message database for possible custom messages and displaying the results of the query to the administrator input device. The computer instructions include selection instructions to allow an administrator to select one or more custom messages to be displayed. The selection instructions can allow the user or administrator to select calling card accounts to receive one or more custom messages. Implementation instructions allow the processor to add the selected custom message to the selected calling card accounts. Edit instructions can be used to enable the administrator to activate, delete, modify, or replace a selected custom message.

BRIEF DESCRIPTION OF THE DRAWINGS

The detailed description will be better understood in conjunction with the accompanying drawings as follows.

Figure 1:
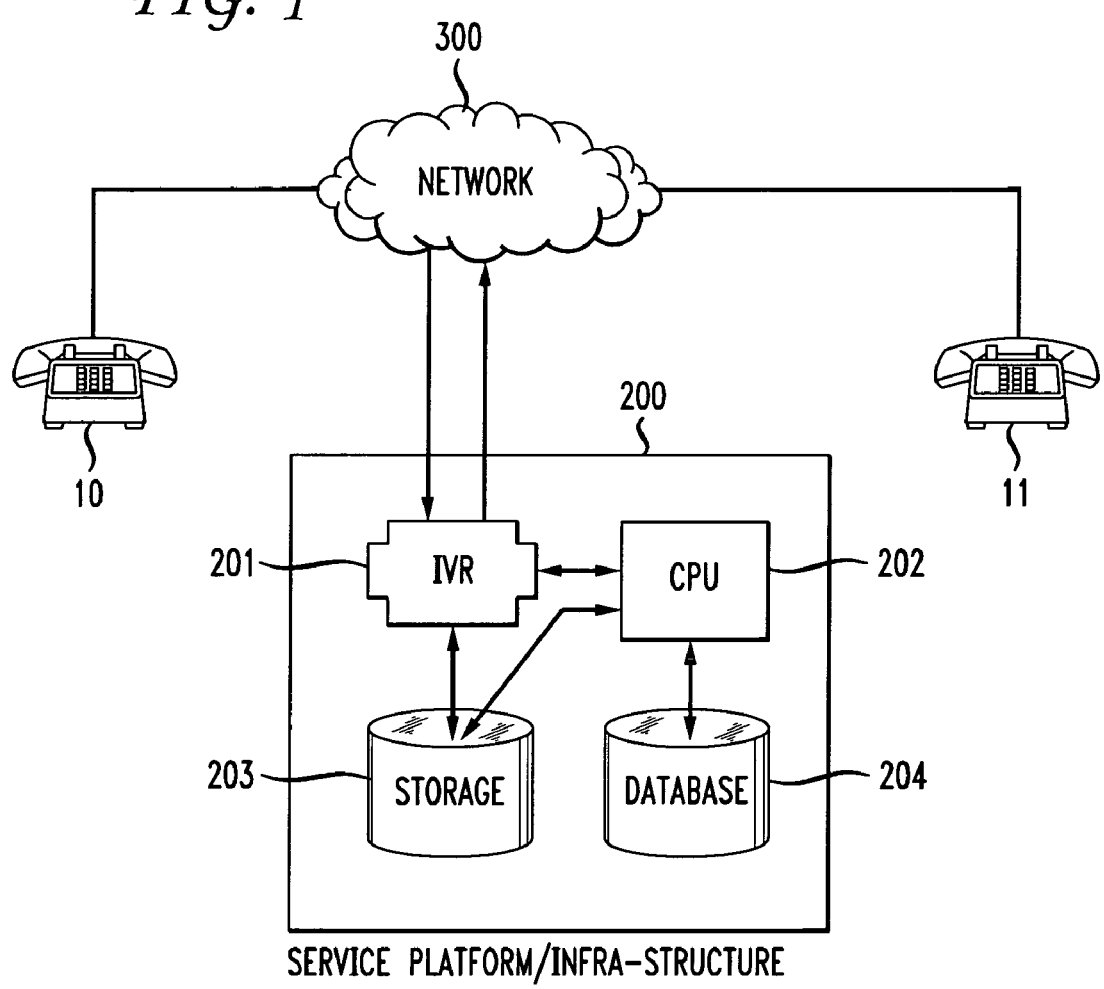
FIG. 1 depicts an embodiment of a service platform/infrastructure for providing prepaid account telephony service through a network system using an interactive voice response device (IVR).

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate to methods and systems for providing a customized message for a calling card account.

The present embodiments contemplate systems and methods for providing a custom message to a calling card account for a user to receive the custom message upon usage of the calling card account. The calling card account can be a telephone card, an internet service paid up service card, another form of paid telecommunications service card, or other prepaid services. The system contemplates a first data storage for storing a calling card account database, wherein the database stores one or more calling card accounts. A second data storage stores a custom message database, wherein the custom message database stores one or more custom messages. The systems include a processor in communication with the databases and in communication with an administrator input.

The embodied systems and methods utilize computer instructions. The computer instructions can include query and display instructions for querying the custom message database for possible custom messages and displaying the results of the query to the administrator input device. Selection instructions can allow the administrator to select one or more custom messages displayed and, then, select calling card accounts to receive the custom messages. Implementation instructions can be used to add the selected custom message to the selected calling card accounts. Edit instructions can be used to enable the administrator to activate, delete, modify, or replace a selected custom message.

In the embodied methods and systems, incremental revenues can be generated by the provider of the calling cards to administrators that utilize a customized messaging service to reach holders of the calling cards. The embodied methods and systems provide a uniform message that can be provided on a real time basis to holders of calling cards that can be helpful for use in emergencies.

An embodiment of the methods and systems enables an administrator to select a pre-recorded message, a "custom message" from a database, and then have that message played to a calling card holder at a designated time, date, or in a particular sequence.

Another embodiment of the methods and systems enable an administrator to record in real-time a client-provided short message and/or announcement that would be played to the calling card holder when the holder places a call using the calling card. The nature of the personalized message can serve a variety of purposes: from just hearing a specialized announcement to a reminder about an emergency or some other important, timely notification in one or more languages.

Another embodiment of the system uses Internet service accounts, wherein an independent party, such as a person leaving a message, provides a 'personalized' message to an account user. The message either pops-up and plays or displays to the users when the user accesses their service account. Another embodiment provides notification of a message that can be displayed or played by clicking on a URL or web-button.

The present embodiments can provide two basic functions: an administrative task for creating, modifying, and controlling the service message; and a presentation task that identifies and retrieves a custom message and performs the custom message when the calling card account is accessed by a user. The custom message can be performed by displaying a text message, providing a Braille message, or by performing an audio message or combinations of these types of performance.

The present embodiments can be incorporated into a generally uniform and standard service treatment provided by a third party service provider, for example a prepaid calling card service provider. The embodiments can incorporate a specific announcement or messaging capability that enables one party to provide a personalized recording or information to a user of a calling card account. The party is termed "the administrator." The administrator can not only be the provider of the calling card, but can be a third party requesting use of the custom message service and being given authority to act as an administrator.

The embodied methods and systems provide a retention function that helps keep customers from jumping to another competitor if the customer desires the capability provided by the embodiments.

The embodiments can be adaptive, in that, the embodiments can be implemented in several different ways. For example, the service platform can implement the functionality within a single system implementation or via a distributed architecture which partitions the functionality across discrete elements, including the possibility of different functional elements being provided by separate entities. The functionality can be operationalized under an advanced intelligent network design approach or via a network wide voice over IP implementation. Similarly, the embodiments can be adapted to an Internet voice application, wherein a calling card account using the Internet as a telecommunications conduit can be equally capable of introducing a third-party announcement or message into the phone connection between either the originating caller or to both of the other parties.

In an alternative embodiment, a private branch exchange (PBX) system can have a comparable capability implemented, wherein an independent user can cause the system to insert a custom or personalized message to one or more parties that have accounts or lines served by the PBX when the account number is accessed.

An embodiment contemplates accessing a calling card account database with an electronic device. The electronic device can be a PDA, a cellular phone, a Blackberry™, or another computer.

The calling card account database can store individual calling card accounts or groups of calling card accounts.

The account database can be stored on a third party service provider's server, or on a plurality of servers, or in a data storage unit connected to a processor. The data storage unit can store the calling card database, the custom message database, and any computer instructions needed.

The processor can be connected to an administrator device that can input queries to view custom messages in the custom message database and a display for viewing the results of the query. The administrator device is contemplated as one that permits the audio performance of the custom message to be heard by the administrator. The administrator device can be an electronic device that communicates a selected custom message to the processor so that the calling card database stores the custom message in communication with the calling card account number. Then, a customized message can be played when a user accesses their calling card account.

The calling card accounts in the calling card database can represent individual cards, such as a 60 minute prepaid calling card, or the database can represent a group of cards assigned a group of minutes, such as 500 cards each assigned to the same account totaling 10,000 minutes or each account having 20 minutes.

The calling card account can represent other prepaid services (such as, prepaid towing services and prepaid travel services) or the calling card account can represent a post-paid account billed monthly based on incurred usage or a set fixed recurring fee. The calling card account number as stored in the calling card account database can be made of numerical sequences, letters, symbols, and combinations thereof. The calling card account number can represent an Internet account.

The calling card account can be accessed by an administrator with an administrator device simply by for example, using a computer to log onto the Internet and accessing a weblink to the database. Other electronic devices can be used for these tasks, such as a personal digital assistant (PDA), a cellular phone, a blackberry®, a PC card, or other communication tool. In another embodiment, the account can be accessed by phoning into an access number by a human using a telephone with push buttons, or using voice recognition software to translate spoken commands to actual commands.

Next, calling card account numbers, one or more, can be entered via the webpage or weblink into the database forming a set of one or more calling card account numbers that will receive the message.

A keyboard can be used or the number can be written onto the screen of a Tablet PC™ or personal digital assistant (PDA) and then transmitted to the database. Other examples of usable electronic devices include a Blackberry™, a cellular phone, or a computer. Alternatively, a human can speak into a wired phone or a computer with voice recognition software that can accept the spoken language and transmit the translated instruction of the spoken terms to the calling card account database.

Similarly, the same electronic device, or a different electronic device can be used to modify, or deactivate the custom messages selected. In an alternative embodiment, more than two electronic devices can be used while practicing these embodiments.

The custom messages database function can provide a menu of custom messages to the electronic device of the administrator.

Examples of types of custom messages include: select a pre-recorded message or announcement such as music with words, select recording of a user's voice delivering a personal or customized message, select a recording from a text to audio database which acknowledges text entered such as with a keyboard from a PDA, and then forms an audio message, or combinations of these.

A transmission variable can be optionally selected to indicate a desired frequency for delivery of one or more selected custom messages, such as a monthly frequency, a daily frequency, or upon activation of the calling card account.

The transmission variable can also be used to indicate if more than one message is desired for a particular calling card account and the rotation schedule between selected custom messages.

The transmission variable can provide expiration dates for the custom messages, so that the custom messages automatically cancel when the calling card account cancels. The expiration date also can be some other predetermined dates. The expiration date can be the initiation date, a specification of performance of the custom message at a designated time each day, or at a plurality of times during a day or week.

The embodied methods can be used by stores as a marketing tool. For example, the stores can schedule daily changing custom messages. For example, a grocery store can list the daily produce special for users of a paid up phone card that is purchased from the grocery store.

The electronic device of the administrator can be a PDA. The screen of the PDA can display the custom messages. The stylus of the PDA can be used to select the custom messages. The selected message choices are then transmitted to the calling card account database for playing when the calling card account is accessed.

For embodiments wherein the administrator is a person using a phone to select the customer message, the person calls an access phone number connected to the calling card account database. The calling card account database can have a voice recognition system or a corresponding touchtone input to enable the phone user to select each custom message as is commonly done in interactive phone-based service systems. The person can verbally transmit the calling card account number into the phone and the voice recognition system can translate the spoken numbers to numbers for matching by the numbers in the calling card account database. If a match occurs, the calling card account database cues the custom messages database. Custom messages can be provided using text to audio software to provide audio choices over the phone. The human administrator can verbally select one or more of the custom messages provided over the phone by speaking into the phone the desired custom messages corresponding code or identifier. The selected custom messages or custom messages are stored with the account number in the accounts database for play at pre-selected intervals associated with the custom messages or at intervals using the transmission variable to designate other times for play.

The calling card account database can then be administered in real time by the user or a third party with an electronic device. The real time administration can include steps to activate a custom message, deactivate a custom message, modify a custom message, replace a custom message, store a plurality of custom messages in a defined sequence, and combinations of these.

The calling card account database can be used for billing custom message use of an administrator. For example, a billing module can be connected to the processor to track charges and different fees depending on which custom messages are used, when custom messages are used, and if the custom messages are recorded or are pre-recorded messages. Different fees can be charged depending on the frequency of play. Fees can vary depending on the number of custom messages selected for storing with the account. Fees can be assessed depending on the number of users to a particular account. Billing of the administrator for the custom messages can vary by use, minutes used, initial activation, monthly periods or combinations of these.

The present embodiments can save lives by providing a method to give a real time message using the system to update one person or entire groups affiliated with a calling card account. For example, prepaid calling cards can be disseminated to all relatives of a school child. For example, the school can hand out a prepaid calling card for each parent of a child. If an emergency occurs at the school, such as a fire, the school can act as the administrator and provide a "real time" status message on the fire and location of their children. It is contemplated that the message can be in any number of languages so that understanding the instruction is possible for a variety of nationalities and heritages. This way, a school can provide a consistent message about the emergency and can give instructions available to all parents, thereby removing panic.

In another example, the present embodiments provide a manner to advise employees concerning a company's events using the real time messaging for employees with calling card accounts. For example, a company can hand out calling cards to employees at the company picnic in June, and then in November, when there is a blizzard, the company can be the administrator, and send a message advising the employees what to do on the snow day in a plurality of languages and employees can use any number of devices, not just a phone to access their information from the calling card account.

For non-emergencies, the present embodiments can enable employers to provide consistent and up to the minute information on changes in location for a meeting, particularly if the meeting is in a different area code from the attendees and last minute information needs to be conveyed.

The embodiments can allow for notification of hundreds and thousands of people who may not all have access to the same kind of messaging service.

The embodied methods and systems can permit two or more individuals to use the calling card accounts to exchange information by a virtual answering machine, wherein one party leaves a message and the other party retrieves the message while not being limited to using a certain electronic device.

The system embodiment of the invention can include an interactive voice response device (IVR) for communicating between the electronic device of an administrator and a processor of the system for providing the audio announcements linked to the calling card account. The IVR device can include a touch tone detector to detect telephone keypad entries, and a voice recognition card that detects voice commands from a user on a telephone. The IVR device can include an Internet protocol card that can take commands from an electronic device, such as a PDA, a Blackberry® a PC card, or a similar device used by the user. The IVR device can include one or more of these features. The IVR device enables the electronic device of the user to interface to the processor.

The system can be used with a prepaid calling card for long distance or other phone usage, a business telecommunications account, a consumer telecommunications account, or some other form of prepaid gift card.

The prepaid calling card can have a code for a business telecommunications account that gives a number to call. A real time recorded message can then be accessed and changed to leave an updated message for other persons using that business telecommunications account.

In an embodiment, activating the custom message can entail having the purchaser place a call to either the standard access number that can be a toll free phone number associated with the calling card that is used to place calls for the current prepaid card service capability, or to a unique number designated specifically to support the message creation task. Upon dialing the access number and entering in the card's account information, the purchaser can select an 'account administration' menu task where they would select the 'personalized' greeting function or be prompted to enter a 'personalized' greeting. The entry of the 'personalized' greeting can be to either record a short announcement or the selection of an announcement from a pre-recorded set. Once the recording or selection is made, the account can be set up to play this announcement before or during the call completion attempt. Under this feature, each account can have an indicator or reference to its associated 'personalized' announcement stored as part of the account's profile.

A variation of the activation methodology can be to use an internet-based web-page for administering and/or recording the personalized announcement.

Example 1

Message Presentation

When a card-holder uses an account, the prepaid system performs all of the standard service functions and can include a process to check if this embodied message feature is active. The card-holder can dial the toll free service access number for the account. The call can be routed to the prepaid card service provider's platform by standard network carriers. The prepaid platform can greet the caller with the normal system acknowledgement and request their card's account number and perform its account validation function. A service menu can include the function of being able to place a call to the caller's desired destination. Once the destination number is entered, the prepaid system can proceed with the call placement function. The prepaid system can then check if an announcement was assigned to the account. If an announcement was assigned, the prepaid system applies or plays the designated announcement. The announcement occurs at the point in the prepaid service call flow where the prepaid system is ready to initiate a call to some destination number. Alternatively, the account's stored announcement custom messages information can indicate that the announcement is to be played to both parties after the call to the destination number is connected. The announcement can be played at any time after the account number is verified, and the associated announcement can be determined by the stored indicator or recording for the individual account.

The messaging feature can operate each and every time that the card-holder places a call until the feature is de-activated. If specified by the user, the messaging feature can be played only once in a given day or week or only during a specified time period, for example during the month of December. Alternatively, the announcements can be set to play in a rotation.

With reference to the figures, FIG. 1 depicts an embodiment of a service platform/infra-structure for providing prepaid account telephony services through a network system (300) which can include the use of an interactive voice response device (IVR) (201) as seen in this figure. The IVR device (201) enables the electronic devices of the users (10 and 11) to interface to the computerized call processor (200). The IVR device (201) can include an Internet protocol card that can take commands through use of a network (300) from an electronic device, such as a PDA, a Blackberry® a PC card, or a similar device used by the user.

The computerized call processor (200) comprises an account database (204) stored in the call processor (200) and having account records corresponding to a plurality of prepaid accounts with each account having an access code and custom messages, a telephone number associated with the calling card account. The IVR (201) contained in the computerized call processor (200) allows communication between the electronic device of a first user (10) and the call processor (200) for providing any audio announcements linked to an account. The computerized call processor (200) receives the first call originating from a first telephone number at the electronic device of the first user (10) and determines whether the first telephone number corresponds to a registered telephone number in the call processor storage (203). If the first telephone number corresponds to a registered telephone number, then the call processor (200) will request the destination number to be called via an IVR (201) request and when received from the electronic device of the first user (1), the first call is connected to the second telephone number at the second user's electronic device (11). Alternatively, as in a prepaid card example where the account is only identified by the account number and its corresponding personal identification number (PIN), the call processor (200) can request the account number and the PIN, validate the account and PIN combination in the account database (204) and then proceed with obtaining the destination number to complete a call connection to the second telephone number at the second user's electronic device (11).

In addition, the call processor, being operative to transfer the account balance from a first account to a second account, comprises a central processing unit (202) which communicates with the IVR (201), the storage (203) and the account database (204) to receive and compare access codes for transferring account balances from the first account to the second account to complete the prepaid account function.

Figure 2:
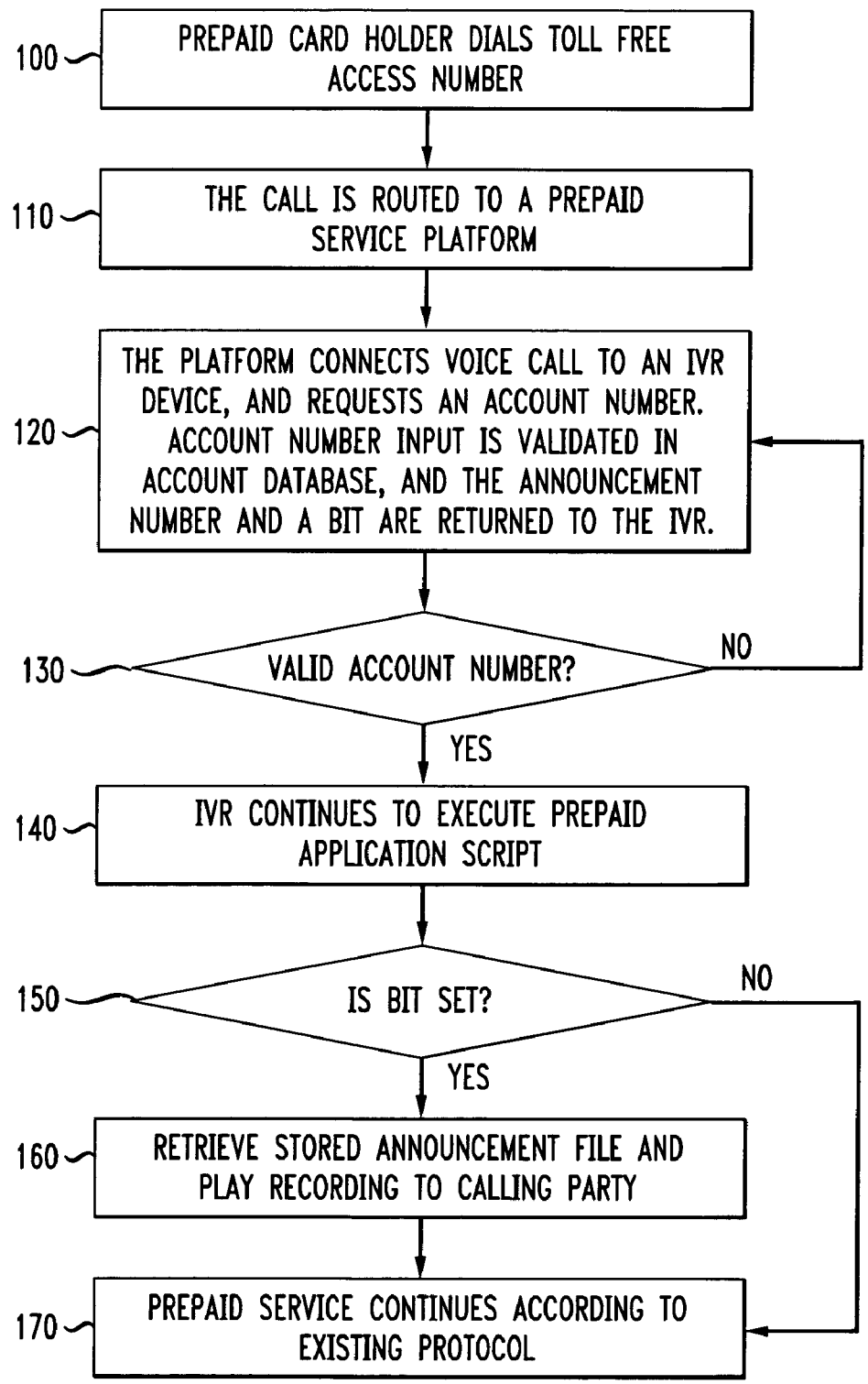
FIG. 2 depicts an embodiment of a method for playing a message.

FIG. 2 depicts an embodiment of a method for playing a message. The method begins by a prepaid card holder dialing a toll free access number (Step 100). The call is routed to a prepaid service platform (Step 110). The platform can then connect the voice call to an IVR device, and request an account number. The account number input is validated against the account database. The announcement number and a bit are returned to the IVR (Step 120). A decision is then made regarding the validity of the account number (Step 130). If the account number is invalid, Step 120 is repeated. If the account number is valid, the IVR continues to execute prepaid application script (Step 140). The prepaid application script is the script associated with using the prepaid card for telephone service. Based on the retrieved value of the custom messages stored with the account, a decision is then made regarding the embodied service bit being set (Step 150). If the bit is set, Step 160 occurs and the stored announcement is played; and if the bit is not set, Step 170 occurs without any personalized message/announcement being delivered. The method continues under the above rule by retrieving a stored announcement file and playing the announcement to a calling party (Step 160). The methods end by continuing the prepaid service according to the existing protocol (Step 170).

Figure 3:
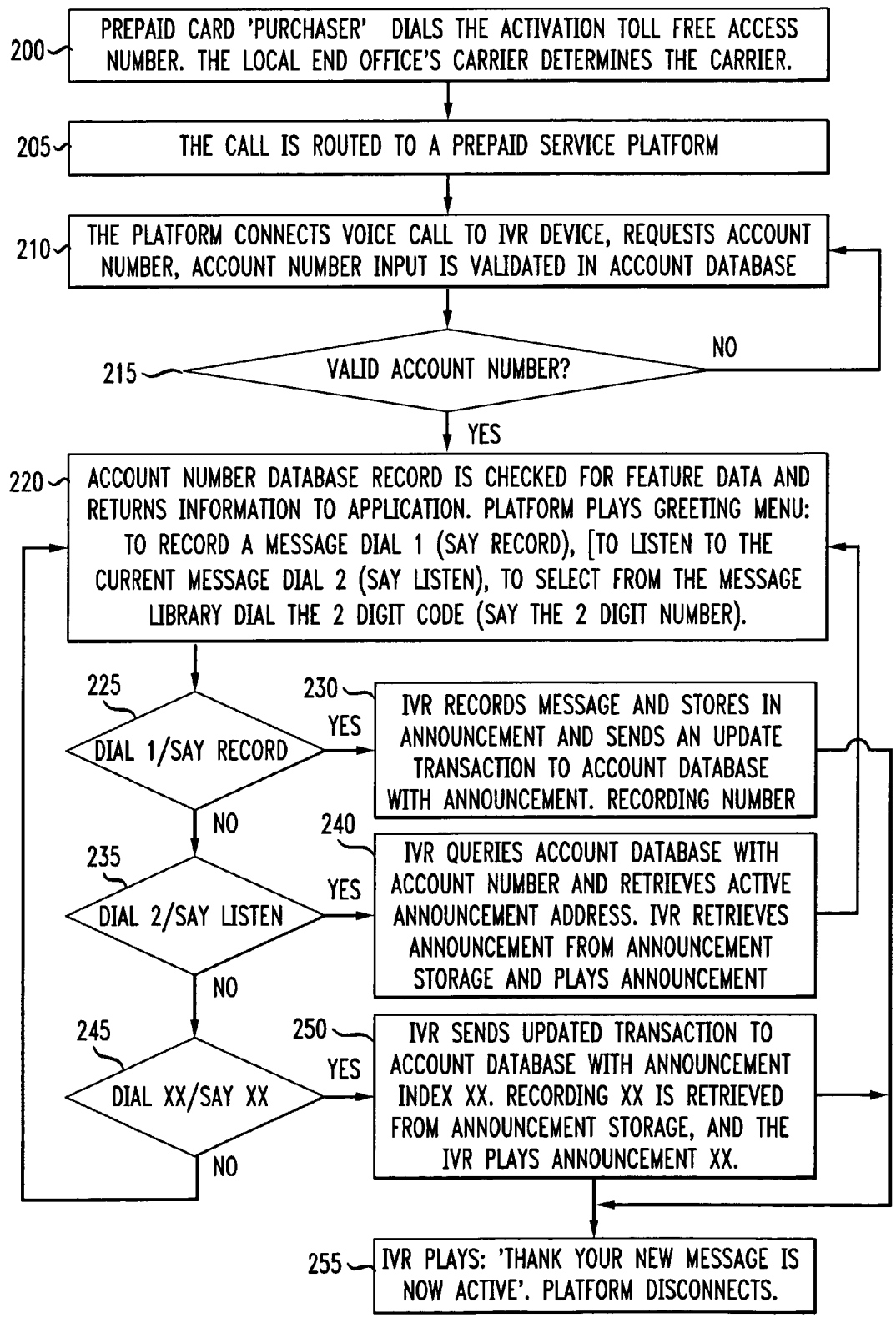
FIG. 3 depicts an embodiment of a method for recording a message.

FIG. 3 depicts an embodiment of a method for recording a message. The method begins by a prepaid card purchaser dialing an activation toll free access number, wherein the carrier is determined (Step 200). The method continues by routing the call to a prepaid service platform (Step 205). The platform can connect the voice call to the IVR device, can request the account number, and can validate the account number in the account database (Step 210). A decision is made regarding the validity of the account number (Step 215). If the account number is not valid, Step 210 is repeated. If the account number is valid, the account number database record is checked for feature data, returns information to the application, and plays a greeting menu. As an example, the greeting menu can have the following custom messages: "To record a message, dial 1 (say record); To listen to the current message, dial 2 (say listen); and To select from the message library, dial one of the two digit codes assigned to pre-recorded system messages (say one of the two digit numbers). If the user dials "1" or says "record" (Step 225), the IVR records a message, stores the announcement and sends an update transaction to the account database with the announcement and recording number (Step 230). If the user dials "2" or says "listen" (Step 235), the IVR queries the account database with the account number and retrieves announcements. Entering a recording number retrieves an announcement and plays the retrieved announcement (Step 240). After the announcement is played, Step 220 can be repeated. If a two digit pre-recorded announcement number is entered or said (Step 245), the IVR sends updated transactions to the account database with an announcement (Step 250). After the completion of Step 230 and Step 250, the IVR can play a message such as "Thank you, your new message is now active" (Step 255). If no number is entered in Step 235, Step 245, or Step 255, Step 220 can be repeated.

The following are some examples of how the messaging concept can be provided to and used by clients.

Example 2A

Special Relation Cards Examples: Mother/Father, Brother/Sister, Girl/Boy-Friend, Other A parent purchases a card and calls the announcement recording access number. When prompted to record an announcement between the tones, the parent records: "Remember to call your mother each week."

A boy-friend purchases a card, calls the recording access number, and records: "I love you, sweetie." The boy-friend then selects to have the message played only once a day. The boy-friend then gives the card to his girl-friend.

A sister purchases a card, calls the recording access number, and enters a two-digit code from the card's store package that designates the following pre-recorded message: "Remember dad's birthday in <month>." The sister is then prompted to enter the two digits for the month. The announcement is played one week before and during the month entered.

Example 2B

Prospect Gift Cards Example

A business-person or sales-person purchases a set of cards, calls the recording access number, and records: "Remember when you are ready to buy that new item, call me." The business-person or sales-person then gives these cards to prospective customer/clients.

Example 2C

Interested Clients, Customers, or Users Example

An antique or art dealer provides cards to some of his clients. Whenever the dealer has something of interest for these individuals, the dealer dials the recording access number, enters the unique key-code for the relevant set of cards, and records or updates a message. For example, the dealer can record the following message: "A new 18th century writing desk has come into the 6th street gallery June 14th." All the cards associated with this announcement address will now hear this message.

Example 2D

Political Candidate Cards Example

A campaign manager or staffer sends prepaid cards to donors or offers "Special Message" cards via the candidate's web-page with a donation. The manager or staffer logs onto a prepaid service web-page for announcement management. The manager or staffer enters the access number assigned to the cards, enters the unique key-code for recording administration, and up-loads or file-transfers a computer file in an approved file format. The file is then stored or converted into an announcement file used by the prepaid system. For example, the message can be from the candidate stating: "I'll vote for a senior's drug benefits program, you just need to vote for me."

While these embodiments have been described with emphasis on the embodiments, it should be understood that within the scope of the appended claims, the embodiments might be practiced other than as specifically described herein.

What is claimed is:

1. A system for providing a custom message, the system comprising:
 a first data storage comprising a plurality of calling card accounts;
 a second data storage comprising a plurality of custom messages;
 a processor in communication with the first data storage and the second data storage;
 an administrator input device in communication with the processor;
 computer instructions executable by the processor to make the system operative to:
  select, from the plurality of custom messages, a selected custom message;
  select, from the plurality of calling card accounts, a selected calling card account to receive the selected custom message;
  associate the selected custom message with the selected calling card account; and if the selected calling card account is accessed by a caller, perform the selected custom message for the caller; and a billing module in communication with the processor, wherein the billing module is configured to:
track usage of the selected custom message and charge an administrator based upon the usage tracked, wherein the billing module charges the administrator a first amount if the selected custom message comprises a recorded message, and the billing module charges the administrator a second amount if the selected custom message comprises a pre-recorded message.

2. The system of claim 1, wherein the computer instructions further comprise edit instructions enabling an administrator to activate, delete, modify, and replace the selected custom message.

3. The system of claim 1, wherein the calling card account comprises a prepaid telephone card.

4. The system of claim 1, wherein the calling card comprises a prepaid Internet services card.

5. The system of claim 1, wherein the calling card comprises a telecommunications account card.

6. The system of claim 1, further comprising an interactive voice response device configured to provide an audio recording as the custom message.

7. The system of claim 1, further comprising an interactive voice response device for communicating between a user of the calling card account and the processor.

8. The system of claim 7, wherein the interactive voice response device comprises a touch tone calling card.

9. The system of claim 1, wherein the calling card account is for a member selected from the group consisting of:
a prepaid calling card;
a business telecommunications account;
a consumer telecommunications account; and
a prepaid gift card.

10. The system of claim 1, wherein performing the selected custom message comprises:
connecting the caller with a called party; and
performing the selected custom message for the caller and the called party.

11. A method for providing a customized message, the method comprising:
selecting, from a plurality of calling card accounts stored at a first storage location, a selected calling card account;
selecting, from a plurality of custom messages stored at a second storage location, a selected custom message;
associating the selected calling card account with the selected custom message;
if the selected calling card account is accessed by a caller, performing the selected custom message for the caller; and
charging an administrator associated with the calling card account for each performance of the selected custom message, wherein the administrator is charged by a billing module that generates a first charge amount if the selected custom message comprises a recorded message, and a second charge amount if the selected custom message comprises a pre-recorded message.

12. The method of claim 11, further comprising:
selecting a transmission variable to be transmitted with the custom message; and
performing the custom message based, at least partially, upon the transmission variable.

13. The method of claim 11, wherein the transmission variable comprises one member selected from the group consisting of: a date to start custom message performance, a date to stop custom message performance, a time to start custom message performance, a language for the custom message, and a sequence of performance for a plurality of selected custom messages.

14. The method of claim 11, further comprising enabling an administrator to:
record new custom messages;
save new custom messages;
import messages from an out-of-network source;
deactivate custom messages;
modify custom messages; and
replace custom messages.

15. The method of claim 11, further comprising generating an audio recording, wherein the audio recording is generated by a text to audio device configured to generate the audio recording based upon text retrieved from the custom message database.

16. The method of claim 11, wherein accessing the calling card account comprises accessing, using an electronic device, wherein the electronic device comprises one device selected from the group consisting of:
a personal digital assistant (PDA);
a cellular phone;
a computer; and
a conventional phone.

17. The method of claim 11, wherein performing the selected custom message for the caller comprises:
connecting the caller with a called party; and
performing the selected custom message for the caller and the called party.

* * * * *